United States Patent
Groos

(10) Patent No.: US 6,268,720 B1
(45) Date of Patent: Jul. 31, 2001

(54) METHOD FOR DETERMINING THE RATES OF MOTION AND WHEEL FOR ROLLER SKATES AND SKATEBOARD

(76) Inventor: Daniel Groos, Belgradstrasse 1, D-80796 München (DE)

( * ) Notice: Subject to any disclaimer, the term of this patent is extended or adjusted under 35 U.S.C. 154(b) by 0 days.

(21) Appl. No.: 09/230,765

(22) PCT Filed: Dec. 13, 1997

(86) PCT No.: PCT/EP97/07019

§ 371 Date: Feb. 1, 1999

§ 102(e) Date: Feb. 1, 1999

(87) PCT Pub. No.: WO98/26846

PCT Pub. Date: Jun. 25, 1998

(30) Foreign Application Priority Data

Dec. 19, 1996 (DE) .............................................. 196 53 117

(51) Int. Cl.[7] .................................................... G01P 3/46
(52) U.S. Cl. ............................ 324/163; 324/160; 73/493; 280/11.221
(58) Field of Search .............................. 324/174, 207.25, 324/166, 160, 168, 171, 175, 173, 163; 340/539; 73/493, 514.29; 280/11.223, 11.19, 11.27, 11.221

(56) References Cited

U.S. PATENT DOCUMENTS

| 2,138,887 | 12/1938 | Segal. . |
| 2,354,708 | 8/1944 | Segal. . |
| 3,387,778 | 6/1968 | Althaus . |
| 4,454,411 | 6/1984 | Hale et al. . |
| 4,689,557 | 8/1987 | Smith et al. . |
| 5,536,026 | * 7/1996 | Pozzobon et al. ................. 280/11.22 |
| 5,721,539 | * 2/1998 | Goetzl ............................... 340/870.3 |
| 5,929,335 | * 7/1999 | Carter ..................................... 73/493 |

FOREIGN PATENT DOCUMENTS

| 92 09 825 U | 11/1992 | (DE) . |
| 4444315 A1 | 6/1996 | (DE) . |
| 296 06 965 U | 8/1996 | (DE) . |
| 296 16 211 U | 12/1996 | (DE) . |
| 19714126 | 10/1997 | (DE) . |
| 297 08 535 U | 10/1997 | (DE) . |
| 29712723 U | 1/1998 | (DE) . |
| 19717589 | 2/1998 | (DE) . |
| 29713992 U | 2/1998 | (DE) . |
| 2 282 521 | 12/1995 | (GB) . |
| 62-177453 | 8/1987 | (JP) . |

OTHER PUBLICATIONS

International Search Report, dated Jun. 4, 1998.

* cited by examiner

*Primary Examiner*—Hezron Williams
*Assistant Examiner*—Anthony Jolly
(74) *Attorney, Agent, or Firm*—Shlesinger, Arkwright & Garvey LLP

(57) ABSTRACT

A wheel for roller skates or roller boards, the wheel having a non-rotating axle of rotation and a wheel body rotatable around an axle of rotation, the wheel includes means for measuring the speed at the wheel and means in the wheel for determining its rate of rotation and/or the actual rate of travel of a user of the roller skate or roller board or other sports equipment containing the wheel.

22 Claims, 6 Drawing Sheets

METHOD FOR DETERMINING THE RATES OF MOTION AND WHEEL FOR ROLLER SKATES AND SKATEBOARD

FIELD OF THE INVENTION

The present invention relates to a method to determine travel quantities and an associated wheel for roller skates and roller boards.

BACKGROUND OF THE INVENTION

Sports equipment for fitting to the feet, for example inline skates, roller skates, grass skis, skateboards or snakeboards, are becoming more and more popular. There is a need to determine the sports achievements performed with such sports equipment, for example the distances travelled or the speed reached (current speed, maximum speed, average speed).

A bicycle is known from U.S. Pat. No. 4,689,557 wherein the speed measurement can be relised by means located in the wheel axle.

The construction described in this publication can, however, not be used in the region of the substantially smaller wheels for roller skates and roller boards as, for example, the signal generated has to be picked up by means of a very complex signal pick-up construction.

A bicycle is known from JP 62-177 453 A which determines the speed via a cyclometer comprising a rotating magnet and a stationary sensor. The mechanism described therein is, however, not suitable for roller skates and roller boards which are exposed to extreme shock strains.

A road skate is known from DE-GM 92 09 825.8 with a travel computer which is fitted to the boot of the road skate. To transfer data from rollers of the road skate to said travel computer, a friction wheel is provided which acts together with a driver wheel attached to the roller suspension. This mechanism is considered very complex and susceptible to breakdown. In addition, it has a large construction.

It is known from DE-GM 296 06 965 to provide a roller for roller skates with a magnet and a coil to generate an induced current to feed a light emitting element. This publication does not deal with the measurement of achievement parameters of a user.

It is known from DE 44 44 315 A1 to provide on an axle fixed to a roller a dynamo to generate current to operate a light. This mechanism also proves to be very complex in practice, with, in addition, a strong friction force which hinders progress being produced by the dynamo. This mechanism is not suitable for rollers which revolve around a non-rotating fixed axle.

Finally, a roller skate is known from German utility model DE 296 16 211 U1 with a frame, a boot which can be connected to the frame and rollers mounted on or in the frame, in which on one of the rollers a contact maker is disposed and on the frame a contact pick-up coupled to the transmitter is disposed, with a receiver equipped with a display fitted for the display of achievement data, which receiver can be taken along by the roller skate, being allocated to said transmitter.

OBJECTS AND SUMMARY OF THE INVENTION

It is the object of this invention to provide a wheel for roller skates and roller boards with which achievement parameters of a user can be measured in a simple, robust and favourably priced manner.

In accordance with one advantageous embodiment, the wheel possesses a coil fixed to its non-rotating axle of rotation and a magnet surrounding the coil concentrically connected to the wheel body. When the wheel turns, the magnet thus rotates around the coil so that a current is induced in the coil. The induced current is proportional to the rate of rotation of the wheel. The induced current (or the induced voltage) can be led in a simple manner to a electronic control means which performs a signal processing. The design with magnet and coil has proved to be very robust and compact in construction. Furthermore, there is, where circumstances require, no additional battery necessary for the power supply to the electronic control means. Advantageously, with the current generated, a storage battery can be charged which ensures a direct current supply for the electronic control means and/or other components. The storage battery and a rectifier connected in series with it can also be integrated in the wheel.

It is conversely also possible to provide a magnet fitted to the axle of rotation and a coil surrounding the magnet concentrically and connected to the wheel body.

Appropriately, the wheel comprises means to determine its ground contact and/or means to determine an angle between a momentary touch-down or contact direction of the wheel and an effective direction of travel of the user of the sports equipment. As, for example, in roller skates or inline skates, only one roller skate or inline skate typically has contact with the ground at any one time, it is possible in this way to determine the roller skate or inline skate having contact with the ground in each case and to determine on this basis the rate of rotation or the rate of travel. Furthermore, by determining the angle between the touch-down direction of the roller and the actual direction of travel, a substantially more exact measurement of the actual parameters of achievement or travel of the user can be performed. This measurement precision meets an urgent need which has existed for some time, in particular in the area of high-performance sports.

Advantageously, dynamometers or force-meters, particularly piezo elements, are used to determine the contact with the ground and/or to determine the angle between the momentary direction of contact of the wheel and the effective direction of travel. Piezo elements of this type are of very compact construction, are robust and can be located at a number of points within the wheel or in its direct environment.

Appropriately, at least one piezo element is located in the wheel body, in particular in an external rolling surface of the wheel, to measure thrust and/or to measure a shear force between ground and wheel. This arrangement allows an especially exact and reliable measurement. The number of piezo elements arranged on the rolling surface can be varied depending on the desired demands on the precision.

Appropriately, a number of piezo elements are spread over the circumference of the wheel body. In this way, it is ensured that any contact with the ground or any change in direction can be detected directly.

It is further possible in an advantageous manner to provide at least one piezo element at the axle of rotation, in particular in the region of axle suspension means to measure thrust and/or a shear force between ground and wheel and/or a precession force caused by a change in direction of the wheel. Here, it is of special advantage that the size or number of dynamometers or piezo elements can be kept small; in addition, they are mounted on the non-rotating axle, which leads to less wear over fitting to the rotating wheel body.

It is further possible to provide at least one piezo element in the axis suspension means and/or on the bearings of the wheel to measure a force of pressure (pressure force) and/or a shear force between ground and wheel and/or a precession force caused by a change in direction of the wheel. Piezo elements arranged in this way are also of compact construction and are less susceptible to wear due to their non-rotating arrangement.

In accordance with another advantageous embodiment, the wheel possesses a sensor extending between the axle of rotation of said wheel and the ground. The sensor attached to the axle of rotation has a length which is slightly larger than the radius of the wheel so that in the event of contact with the ground the sensor can detect this in a certain manner. Spring elements, elastic elements, rigid elements with sprung partial regions, etc. can, for example, be provided as sensors. Optical and/or electrical devices are feasible to determine the contact with the ground.

Advantageously, the sensor possesses at least one dynamometer, in particular a piezo element to detect the contact with the ground and/or an angle between the momentary direction of contact of the wheel and the actual direction of travel.

Preferably, the sensor is fixed to an extension to the axle of rotation provided outside the axle suspension. Such an axle of rotation extension can be executed with little constructive effort.

Appropriately, the magnet and coil can be integrated in modular fashion as components of a generator in the wheel body, with the generator shaft being able to be used as the axle of rotation. This modular-type of construction has proved to be particularly favourable in cost as it can be inserted in a simple manner into a wheel hollowed out accordingly. The assembly work on the wheel is thus reduced.

Advantageously, the wheel possesses electronic control means integrated in the wheel body. In this way, the signal paths, for example from the coil or from the piezo elements used, are very short, by which means a fast and reliable transfer or processing of data is ensured.

Appropriately, radio connection means are provided for the exchange of data with another wheel, in particular a wheel of a second roller skate and/or with a display device, in particular one formed in the manner of a wrist watch, to display the data determined. In this way, the data determined can be displayed to the user in a simple fashion. Furthermore, thanks to the data transfer between single rollers, the essential components of the electronic control means can be provided only in one roller, with this also processing data transferred from other rollers.

Advantageously, a current generated via the magnet coil arrangement or via the generator can be utilised for further functions, in particular to feed a diode rear light connected to the sports equipment. In this way, the road traffic safety of a roller skate or roller board provided with the wheel in accordance with the invention is increased. Acoustic warning devices can also be operated in this way.

In accordance with a particularly preferred embodiment of the invention, the means to determine the ground contact possess a device to pick up or record a measurement curve describing the rate of rotation of the wheel. When the wheel contacts or is lifted off the ground or surface, such a measurement curve shows kinks (irregularities in the differentiation function of the measurement curve) which can, for example, be detected by the electronic means integrated in the wheel, by means of which the ground contact intervals can be determined in simple fashion. By means of this measurement curve or its kinks, certain travel states of the wheel can also be detected, for example acceleration, constant travel or braking. To keep the costs for the fitting of a roller skate or roller board with a speedometer device low, preferably only one wheel in accordance with the invention is provided per pair of roller skates or inline skates. The distance covered by a user during which the boot with the relevant wheel has no contact with the ground can be extrapolated from the directly preceding measurements.

In accordance with an advantageous embodiment of the method in accordance with the invention, the ground contact of the at least one wheel is determined at which the rate of rotation and/or the angle between its direction of contact and the actual direction of travel is detected. In this way, an improved precision of measurement is possible as always only measuring data of a wheel in contact with the ground are processed. It is, for example, also possible, in the event of a simultaneous contact of two wheels provided with the measuring devices in accordance with the invention, to pick up both measurement values and to form a mean value from this. In this way, the measuring precision can also be further increased.

In summary, the present invention is directed to a wheel for roller skates or roller boards, with a non-rotating axle of rotation (9, 19) and a wheel body rotatable around the axle of rotation and means to measure the speed at the wheel, with means (2, 4, 5, 10) being provided in the wheel to determine its rate of rotation and/or the actual rate of travel of a user of the sports equipment.

BRIEF DESCRIPTION OF THE DRAWINGS

Preferred embodiments of the invention are now described in detail by means of the enclosed drawings in which.

DETAILED DESCRIPTION OF THE PREFERRED EMBODIMENTS

In FIGS. 1 to 4, wheels or rollers 20 are shown which can rotate around a non-rotating axle 9 or 19. Such wheels are used, for example, on roller skates or inline skates, or also skateboards, snakeboards or grass skis. The rollers are formed symmetrically around the axles 9, 19 so that a presentation of the portion below the axle 9 has been omitted.

Figure 1:
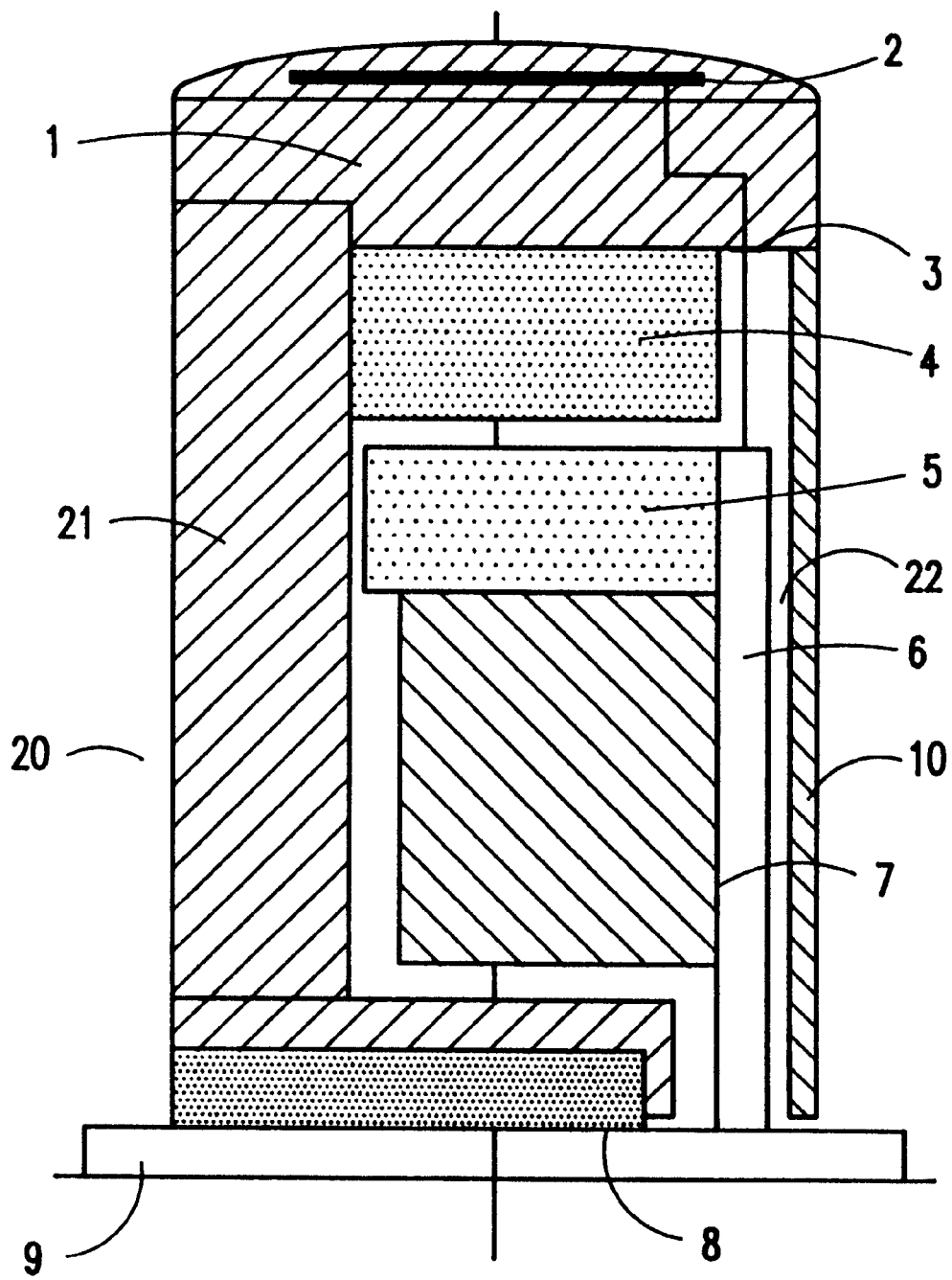
FIG. 1 shows a schematic partial sectional view of a first embodiment of the wheel in accordance with the invention.

In FIG. 1, wheel 20 comprises a wheel body 21 which is provided with a recess in which a permanent magnet 4, a coil 5 and a electronic control means 7 can be inserted.

The electronic control means 7 and coil 5 are here fitted in a non-rotating manner with respect to the non-rotating axle 9. The at least one permanent magnet 4 is mounted in a non-rotating manner on the wheel body 21 so that it can rotate with this around axle 9. The coil 5 is mounted on a coil mount 6.

A protective cap 10 is provided which protects the components inserted in the recess 22 from external influences. The wheel body 21 is mounted via a bearing 8 in a rotating manner on the axle 9.

A piezo element 2 is located in the running surface 1 of the wheel body 21. When a force is applied to the piezo element 2, this generates a current (or a voltage) which can be transferred to the electronic control means 7 via lines and a wiper contact 3.

The piezo element 2 can be used to measure a force of pressure to determine the contact with the ground of the wheel 20 and/or to determine a shear force between ground and wheel.

Force of pressure occurs when strain is put on the wheel 20, i.e. when the weight of the user is put on the roller skate or inline skate connected to the wheel 20. A shear force occurs when the touch-down direction of the wheel does not correspond to the actual direction of travel of the user. Such an angle between the touch-down direction and the direction of travel occurs in particular frequently with roller skates and inline skates as here preferably the so-called "ice-skating step" is used to effect progress. It is possible to locate several piezo elements 2 in the running surface 1 with certain piezo elements 2 being able to measure the force of pressure and other piezo elements the shear force.

When the wheel 20 turns or rotates, the magnets fixed to the wheel body 21 orbit around the coils attached in a fixed manner to the non-rotating or rigid axle 9, with a voltage dependent on the rotational speed of the roller being induced in said coils. Via an A/D converter and a control function, the generated voltage is allocated a rotational speed from which, the roller diameter being known, the distance the wheel has covered is determined. It should be mentioned here that this measurement method can also detect a backwards motion of the user.

Since, as described, when travelling, the roller skates or inline skates are not always put down in the direction of travel (ice-skating step), the distance covered by the wheel does not correspond to the actual distance of the user or the roller skater or inline skater. To nevertheless determine the actual travel distance, the angle between boot and direction of travel is determined by means of piezo elements 2, as is information on the ground contact of the wheels 20. These data are also transferred to the electronic control means 7, in particular via a wiper contact 3.

Figure 2:
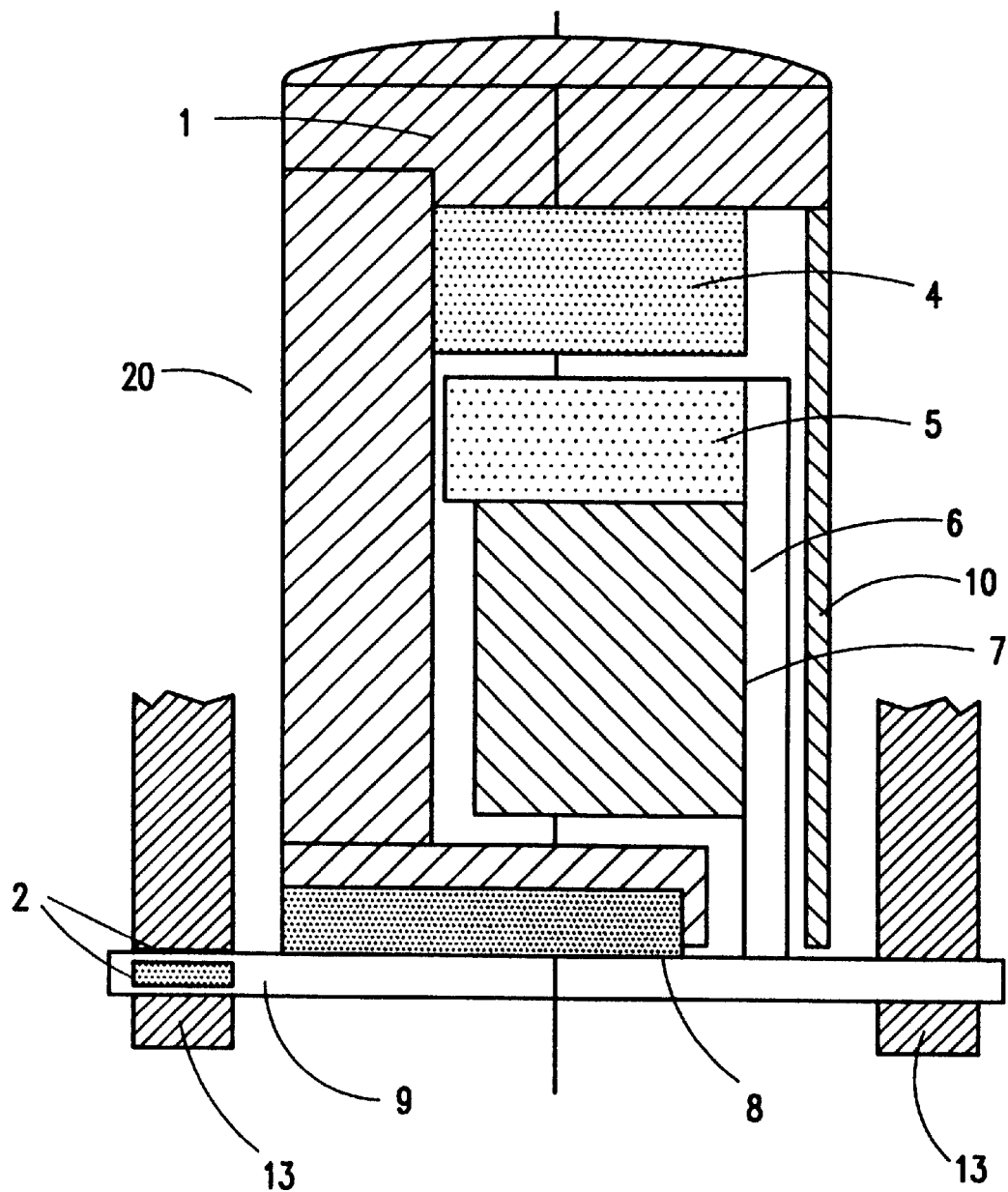
FIG. 2 shows a schematic partial sectional view of the second embodiment of the wheel in accordance with the invention.

FIG. 2 shows another embodiment of the wheel in accordance with the invention. Identical components are provided with the identical reference numbers to FIG. 1. The embodiment of FIG. 2 essentially differs from that of FIG. 1 in that the dynamometer or piezo elements 2 in the non-rotating axle 9 are integrated at the height of at least one axle suspension means 13. The forces acting upon the roller 20, which were described, for example, with reference to FIG. 1, are transferred to the piezo elements arranged in the suspension means 13 via the axle 9. In addition to the measurement of a pressure-force or a shear force, piezo elements arranged in this way are also able to measure precession forces or gyroscopic forces. If, namely, the wheel 20 is considered as a gyroscope, a change in direction of the roller skate or inline skate, that is also a change in direction of the axle of rotation 9, is then equivalent to an artificial precession. Depending on the degree of the change of direction, more or less strong bearing forces can be observed. Said bearing forces accordingly depend on the strain of the wheel 20 and the angle between the direction of contact and the actual direction of travel, with additional precession forces being able to be used additionally here for the measurement.

In this connection, it is possible, for example, for the purpose of simplification of the data processing, for the manufacturer to record measuring series corresponding to different angle positions and/or different angle changes and to program these into the electronic control means. In this way, force quantities actually measured can be compared with the measuring series values in which way a simplification of the data processing is possible.

The non-rotating arrangement of the piezo elements 2, in particular in the region of the axle suspension means, allows the size or the number of piezo elements to be kept very small. In addition, in this way the mechanical strain or the wear of the piezo elements can be reduced.

Figure 3:
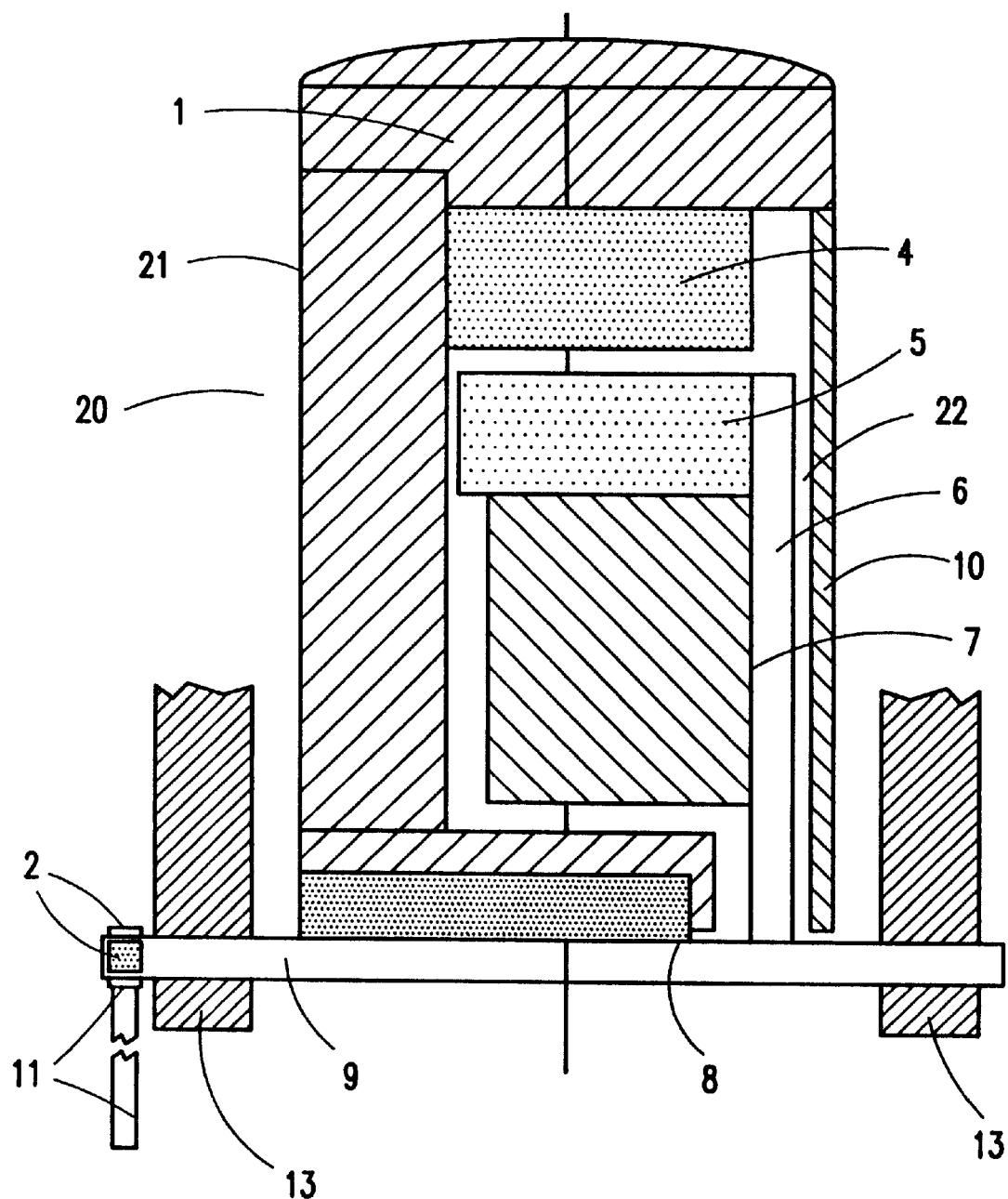
FIG. 3 shows a schematic partial sectional view of a third embodiment of the wheel in accordance with the invention.

Another embodiment of the wheel in accordance with the invention is shown in FIG. 3. Here, too, identical components are identified with the same reference numbers.

Here, instead of the transfer of force via the roller body 21 and the axle 9, a transfer of force is performed via a sensor 11 to piezo elements 2. The sensor 11 is fitted to an extension of the axle 9 provided outside the axle suspension means 13. The length of the sensor is slightly larger than the radius of the wheel so that any ground contact of the wheel 20 can always be detected via the sensor 11. In accordance with the embodiments already described, forces of pressure and shear forces can be transferred to the correspondingly positioned piezo elements via the sensor 11 so that the required data processing essentially corresponds to that already described.

The sensor can, for example, be defined in the form of an elastic or flexible lamellar or brush-like element. It can furthermore be formed as an essentially rigid rod with an elastic end region. Particularly, preferred is the measurement of ground contact and travel angle by means of two piezo elements 2.

Figure 4:
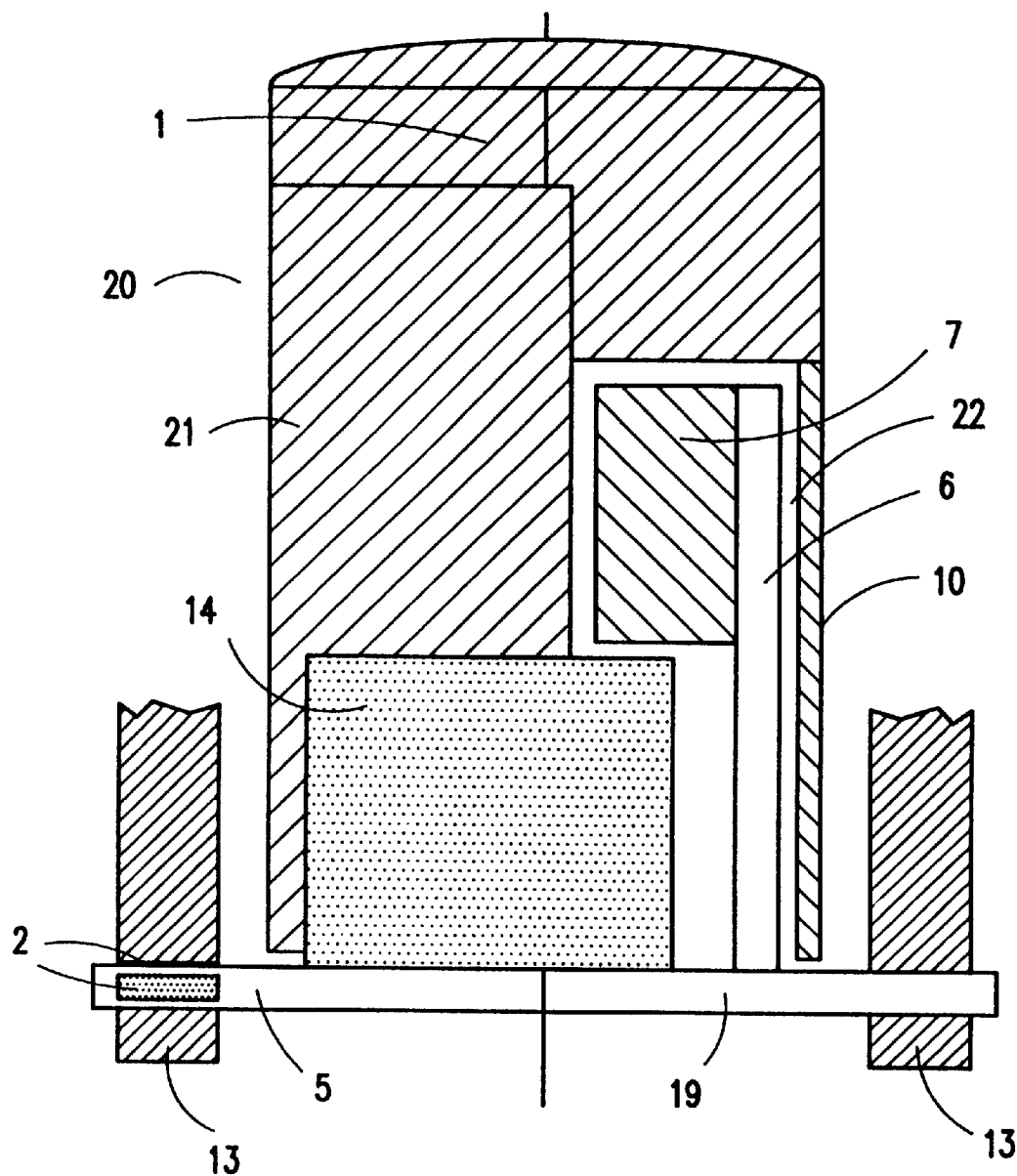
FIG. 4 shows a schematic partial sectional view of a fourth embodiment of the wheel in accordance with the invention.

FIG. 4 shows another embodiment of the wheel in accordance with the invention. Here, the elements used to generate the current or voltage, i.e. permanent magnet and coil, are fitted in a generator 14 in modular form. The shaft of the generator 14 can here be used as a non-rotating shaft 19 of the wheel. If the generator 14 is inserted in a corresponding recess in the roller body 21, depending on the design aspect of the generator as an outer pole generator or an inner pole generator, either the permanent magnet or the coil is connected in a non-rotating manner to the generator axle 19. The housing of the generator 14 together with the other element required in each case to generate the current, i.e. the coil or the permanent magnet, is pivoted around the generator axle 19 and can be connected to the roller body 21. When the roller body 21 is turned around the generator shaft 19 serving as the axle of rotation, current or voltage is thus generated in the manner described above.

The piezo elements 2 provided for the measurement of force are formed in the embodiment shown in FIG. 3 in the axle of rotation 19 at the height of the axle suspension means. It is, however, also possible to use one of the other possibilities described to measure the force.

The data determined in each case are evaluated in the electronic control means 7 and transferred, for example, via a radio connection to a receiver on the wrist of the user who has them displayed on a wrist watch-like display. The current generated in accordance with the invention to measure achievement parameters of a user is also sufficient for other uses. In particular, it is possible to use the current to operate a diode rear light fitted to the boots, by means of which safety in road traffic is increased. A watch or a timer can also be operated in this way. Here, the user of a storage battery has proved to be of advantage, which storage battery evens out and stores the current generated via a rectifier. In this way, the current supply of the lighting can also be maintained during a short standstill of the roller.

Figure 5:
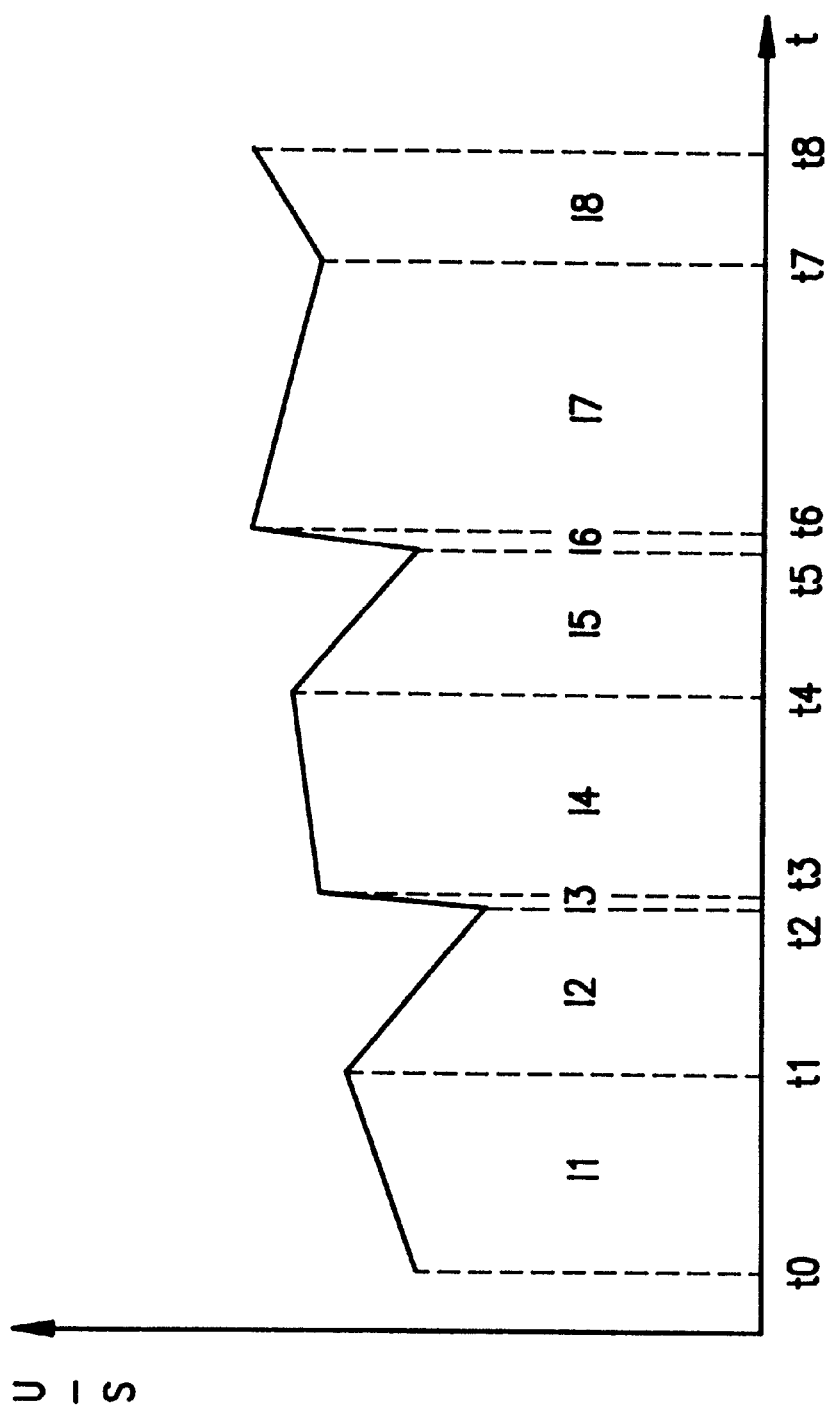
FIG. 5 shows a measurement curve in which revolutions per second of a wheel in accordance with the invention is entered over time.

With reference to FIG. 5, a preferred method is now described to determine the travel speed of a roller skater. Here, the measured revolutions per second of a wheel are entered against the time. During intervals I1 and I4, the revolution speed of the wheel increases. At times t1 and t4, the measurement curve shows kinks to which intervals I2 and I5 of falling revolution speed connect. It is concluded from the kink behaviour of the measurement curve at times t1, t4 and the subsequent fall in revolution speed, that at these times the wheel is lifted off the ground. During the intervals I2 and I5, the wheel is in the air. Only at times t2 and t5, which are characterised by a kink behaviour and a subsequent rapid increase in the revolution speed, does the wheel again come back onto the ground and is subjected to acceleration. Here, the intervals I1 and I4 already mentioned connect to the phases of strong acceleration (intervals I3 to I6) caused by the touching down of the wheel. It should be mentioned here that the transition from I3 to I4 or from I6 to I7 will run more smoothly in practice than shown in this schematic presentation. Furthermore, intervals I7 and I8 are shown. Interval I7 is a roll-out phase in which the revolution speed of the wheel gradually reduces (without any kink behaviour). At interval I8, an acceleration out of the roll phase occurs, with again no kink behaviour being present, the wheel therefore not being raised off the ground.

In this connection, is proves appropriate to include or program individual parameters of a roller skater in the electronic control means. Reference is made here, for example, to the step length or typical touch-down angle of a roller skater. By using such parameters, the computation effort to be performed by the electronic control means can be reduced.

Figure 6:
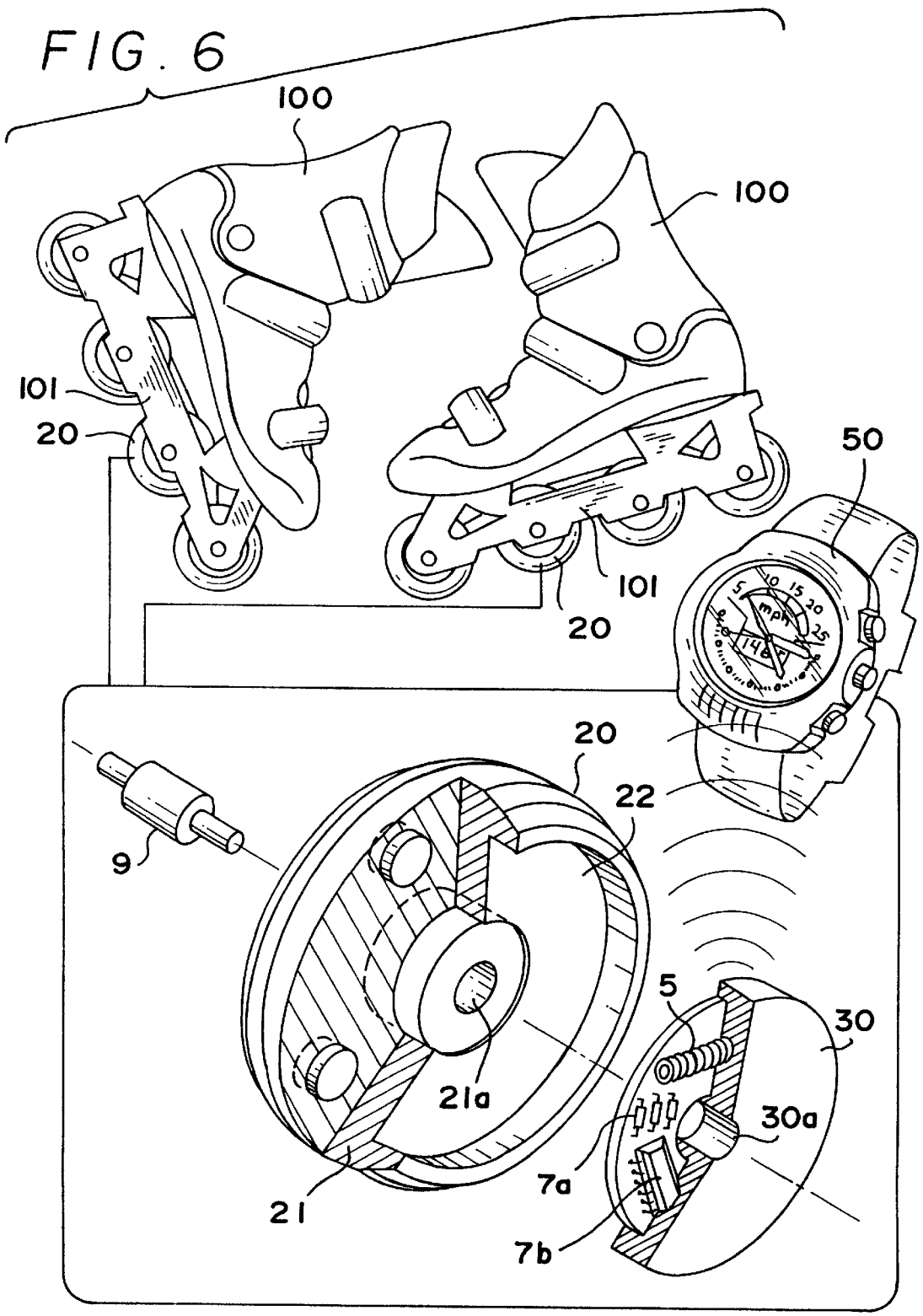
FIG. 6 shows in a perspective view a preferred embodiment of a wheel in accordance with the invention, with the arrangement of the wheel on roller skates and the transfer of measurement data to a display device designated in the manner of a wrist watch are additionally shown by way of illustration.

In FIG. 6, finally, another embodiment of a wheel for roller skates and roller boards is shown in perspective. Here, wheel 20 possesses a wheel body 21 formed with a recess 22.

At least one permanent magnet can be integrated in the wheel body 21 in a suitable manner (not shown).

One possible position of a measuring wheel in accordance with the invention on a roller skate 100 is also shown schematically in FIG. 6. The fixing of the wheel axle 9 to a wheel rail 101 is performed here in a manner known per se and need not be further explained here.

In recess 22, a puck-shaped or cylindrical washer shaped component 30 can be inserted or fitted. In this component 30, the electronic components described above to measure the speed at the wheel are inserted. By way of example, a coil 5, resistors or amplifiers 7a and a chip 7b of the electronic control means 7 are shown schematically. These components are preferably cast or sealed into component 30 which in particular consists of synthetic resin. Component 30 possesses a central recess 30a which, when the component 30 is inserted into the recess 22 of the wheel 20, fits flush with a central recess 21a formed there. The non-rotating axle 9 can be fitted through the flush recesses 21a, 30a. Component 30 can be connected in a non-rotating manner with axle 9. When the wheel turns, axle 9 and component 30 thus remain non-rotatory with respect to the rotating wheel 20. By integrating the electronic components in component 30, a protective cap 10 such as was provided in the other embodiments can be dispensed with. Such a design proves to be very robust. Furthermore, the component 30 containing the electronic control means can be replaced in modular form.

By means of the chip 7b, measuring values recorded can be transferred by radio to a display device 50 designed in the manner of a wrist watch as also shown schematically in FIG. 6.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A wheel for roller skates and roller boards sports equipment having a non-rotating axle, comprising:
   a) a wheel body for being rotatably mounted around the non-rotating axle;
   b) means disposed in said wheel body for determining rotational speed of said wheel; and
   c) means disposed in said wheel body for determining the actual speed of travel of a user.

2. A wheel for roller skates and roller boards sports equipment having a non-rotating axle, comprising:
   a) a wheel body for being rotatably mounted around the non-rotating axle;
   b) means disposed in said wheel body for determining rotational speed of said wheel;
   c) means for determining ground contact with said wheel;
   d) means for determining an angle between a touch-down direction of said wheel body and an actual direction of travel of a user; and
   e) means for determining the actual speed of travel of the user from the rotational speed of said wheel, the ground contact of said wheel and said angle.

3. A wheel for roller skates and roller boards sports equipment having a non-rotating axle, comprising:
   a) a wheel body for being rotatably mounted around the non-rotating axle;
   b) means disposed in said wheel body for determining rotational speed of said wheel;
   c) means for determining ground contact of said wheel including means for recording a measurement curve representative of the rate of rotation of said wheel whereby the ground contact is determined from kinks occurring in the measurement curve.

4. A wheel for roller skates and roller boards sports equipment having a non-rotating axle, comprising:
   a) a wheel body for being rotatably mounted around the non-rotating axle;
   b) an insertable component for insertion in said wheel body in a non-rotating manner with respect to the non-rotating axle; and
   c) said component including means for determining the rotational speed of said wheel body and the actual speed of travel of a user.

5. A wheel for roller skates and roller boards sports equipment having a non-rotating axle, comprising:
   a) a wheel body for being rotatably mounted around the non-rotating axle;
   b) a transducer mounted in said wheel body to provide an output signal proportional to the rate of rotation of said wheel;
   c) sensor to determine ground contact of said wheel; and
   d) an electronic control mounted in said wheel body and operably connected to said transducer and said sensor to determine the actual speed of travel of a user.

6. A wheel as in claim 5, wherein:
   a) said transducer includes a coil and a magnet operably associated with each other such that said coil generates an output proportional to the rotational speed of said wheel.

7. A wheel as in claim 6, wherein:
   a) said coil is mounted in a non-rotating manner with respect to the non-rotating axle; and
   b) said magnet is mounted to said wheel body.

8. A wheel as in claim 6, wherein:
   a) said coil is mounted to said wheel body; and
   b) said magnet is mounted in a non-rotating manner to the non-rotating axle.

9. A wheel as in claim 5, and further comprising:
   a) another sensor to determine an angle between a touch-down direction of said wheel and an actual direction of travel of a user.

10. A wheel as in claim 5, wherein said sensor includes a piezo element located in an external running surface of said wheel body.

11. A wheel as in claim 5, wherein said sensor includes a number of piezo elements spread over the circumference of said wheel body.

12. A wheel as in claim 5, wherein said sensor includes a piezo element provided on the non-rotating axle and in a region of an axle suspension means.

13. A wheel as in claim 5, wherein said sensor includes a piezo element provided in a wheel axle suspension means and wheel bearings of said wheel.

14. A wheel as in claim 5, wherein said sensor extends between the non-rotating axle and the ground.

15. A wheel as in claim 14, wherein said sensor is fixed to an extension of the non-rotating axle and an exterior of an axle suspension means.

16. A wheel as in claim 5, and further comprising:
   a) a generator including a magnet and a coil provided in said wheel body; and
   b) said generator includes a shaft functioning as the non-rotating axle.

17. A wheel as in claim 5, wherein said transducer and said electronic control are disposed in an insertable component for insertion in said wheel body in a non-rotating manner with respect to the non-rotating axle.

18. A wheel as in claim 17, wherein said insertable component includes a synthetic resin into which said transducer and said electronic control are cast.

19. A wheel as in claim 5, and further comprising:
   a) a wrist watch-like display including a receiver in radio connection with said electronic control.

20. A wheel for roller skates and roller boards sports equipment having a non-rotating axle, comprising:
   a) a wheel body for being rotatably mounted around the non-rotating axle;
   b) a transducer mounted in said wheel body to provide an output signal proportional to the rate of rotation of said wheel;
   c) sensor to determine ground contact of said wheel and an angle between the touch-down direction of said wheel and the actual direction of travel of a user; and
   d) an electronic control mounted in said wheel body and operably connected to said transducer and said sensor to determine the actual speed of travel of a user.

21. A method for determining the rate of travel or the travel distance of a user of roller skates or roller boards, comprising:
   a) determining the rate of rotation of a wheel of the roller skates or roller boards;
   b) determining the angle between the touch-down direction of the wheel and the actual direction of travel of a user;
   c) determining ground contact of the wheel; and
   d) determining the rate of travel or the travel distance of the user from the rate of rotation of the wheel, ground contact of the wheel and the angle between the touch-down direction of the wheel and the actual direction of travel of a the user.

22. A method as in claim 21, wherein:
   a) said determining ground contact is implemented by recording a measurement curve describing the rotational speed of the wheel; and
   b) determining ground contact from kinks in the measurement curve.

* * * * *